United States Patent
McKenzie et al.

(10) Patent No.: US 11,381,198 B1
(45) Date of Patent: Jul. 5, 2022

(54) MARINA SOLAR ENERGY SYSTEM AND METHOD

(71) Applicants: Ryan Steven McKenzie, Los Angeles, CA (US); Benjamin Norrie, Los Angeles, CA (US)

(72) Inventors: Ryan Steven McKenzie, Los Angeles, CA (US); Benjamin Norrie, Los Angeles, CA (US)

( * ) Notice: Subject to any disclaimer, the term of this patent is extended or adjusted under 35 U.S.C. 154(b) by 0 days.

(21) Appl. No.: 17/389,535

(22) Filed: Jul. 30, 2021

(51) Int. Cl.
*H02S 40/36* (2014.01)
*H02S 40/38* (2014.01)
*H02S 20/20* (2014.01)

(52) U.S. Cl.
CPC .............. *H02S 20/20* (2014.12); *H02S 40/36* (2014.12); *H02S 40/38* (2014.12)

(58) Field of Classification Search
None
See application file for complete search history.

(56) References Cited

U.S. PATENT DOCUMENTS

| | | | | |
|---|---|---|---|---|
| 5,433,259 A | * | 7/1995 | Faludy | B60P 3/343 |
| | | | | 136/245 |
| 2008/0110492 A1 | * | 5/2008 | Buller | H02S 20/00 |
| | | | | 136/251 |
| 2009/0058352 A1 | * | 3/2009 | Lin | H02J 7/35 |
| | | | | 320/101 |
| 2009/0266397 A1 | * | 10/2009 | Gibson | H01M 10/465 |
| | | | | 136/244 |
| 2013/0305528 A1 | * | 11/2013 | Anderson | H02S 20/30 |
| | | | | 29/825 |
| 2017/0155357 A1 | * | 6/2017 | Vignal | H01L 31/042 |

OTHER PUBLICATIONS

Author Unknown, DockBox.com by Better Way Products, accessed on Oct. 27, 2021 and archived to May 30, 2020. (Year: 2020).*

* cited by examiner

*Primary Examiner* — Eli S Mekhlin
(74) *Attorney, Agent, or Firm* — Cohen IP Law Group, PC; Michael N. Cohen

(57) ABSTRACT

A marina solar energy system and method is provided. The system includes one or more base assemblies designed to support corresponding solar panel assemblies. For example, the system may include dock box lids with recesses adapted to receive and secure one or more solar panels, and an energy distribution system to receive and distribute the energy produced by the solar panel assemblies (e.g., to other areas of the marina, to a local power grid, etc.). The system also may include rechargeable power sources, such as rechargeable battery packs, that may store the energy produced by the solar panels. The system also may include electrical outlets for use by occupants of the marina.

19 Claims, 12 Drawing Sheets

MARINA SOLAR ENERGY SYSTEM AND METHOD

FIELD OF THE INVENTION

This invention relates to solar energy systems and methods, including solar energy systems and methods for use within a marina.

BACKGROUND

Solar energy installations on rooftops and other sun-facing structures are becoming ubiquitous throughout the world. However, there are many areas that include surfaces that face the sun and that would benefit from generating solar energy, but that are not adequately adapted to support solar panels. As such, these areas are not able to take advantage of solar energy technologies.

For example, marinas would benefit greatly if able to generate solar energy, and while marinas may include a variety of unobstructed sun-facing surfaces, marinas in general are not equipped with solar panels.

Accordingly, there is a need for a marina solar energy system that adapts surfaces typically found at marinas into solar panel support surfaces. There also is a need for a solar energy distribution system to distribute solar energy generated within a marina.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF EXEMPLARY EMBODIMENTS

In general, the system according to exemplary embodiments hereof provides a system and method for generating solar energy within a marina. The system combines solar panel assemblies with other items of utility often found within a marina. For example, the system may integrate solar panels into items such as the lid of a dock box. The system also may include an energy distribution network to distribute the generated energy to various areas within the marina, to a local power grid, and/or to other areas. The system also may include rechargeable power sources that may store the generated energy for later use, and power outlets for occupants of the marina to use to power their personal devices.

Referring now to FIGS. 1-8, the solar energy system 10 according to exemplary embodiments hereof will be described in further detail.

Figure 1:
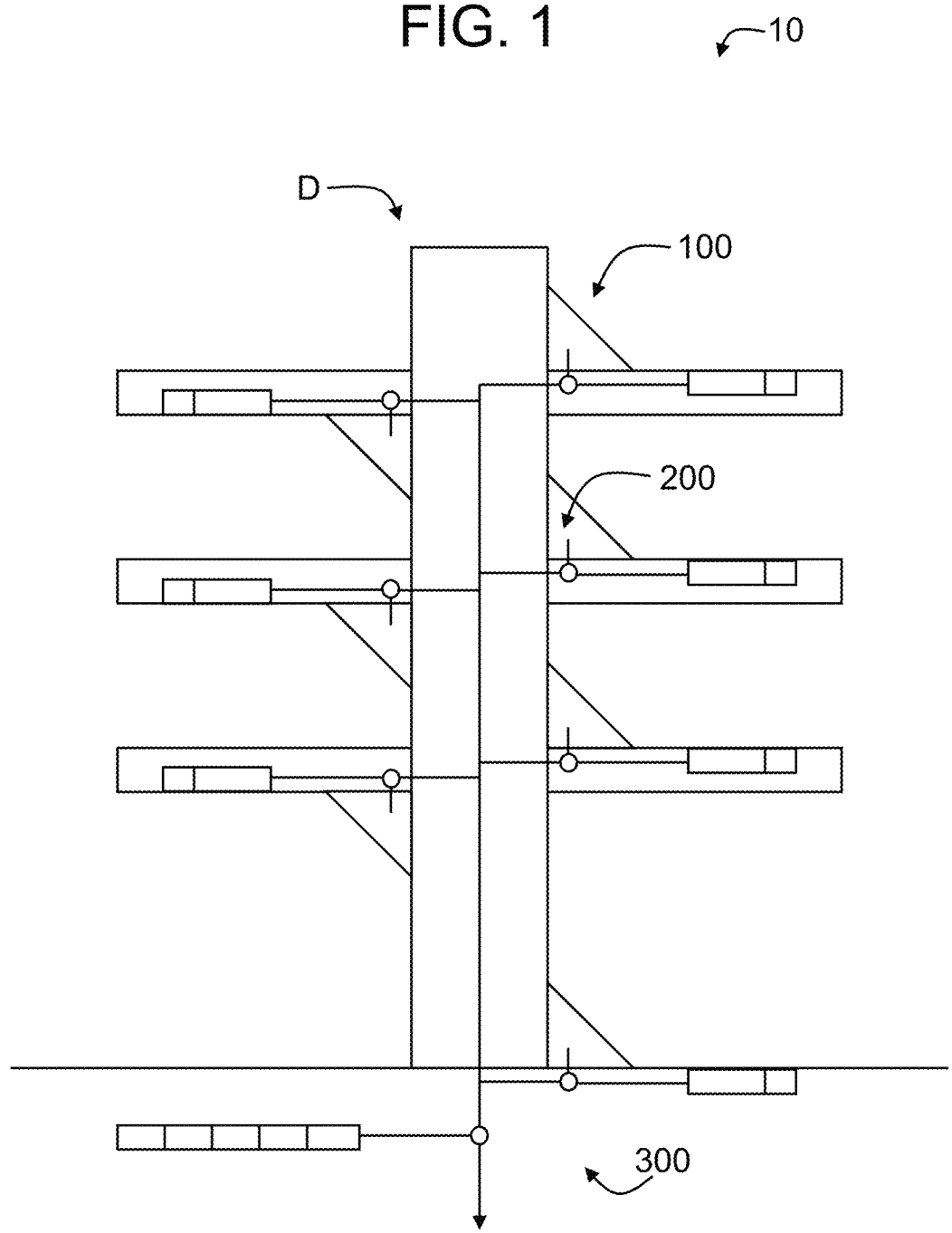
FIG. 1 shows aspects of a marina solar energy system according to exemplary embodiments hereof.

In one exemplary embodiment hereof as shown in FIG. 1, the solar energy system 10 includes one or more solar panel base assemblies 100, one or more solar panel assemblies 200, and an energy distribution system 300. As described in later sections, the system 10 may be used to generally collect, store and/or distribute solar energy (e.g., at a dock D within a marina and/or other environment(s)). The solar panel base assemblies 100 provide support to one or more solar panel assemblies 200 as the panels produce energy, and the energy distribution system 300 distributes the energy produced. The system 10 also may include other elements and components as necessary to fulfill its functionalities.

Solar Panel Base Assemblies 100

In general, the solar energy system 10 includes one or more solar panel base assemblies 100 adapted to provide support to one or more solar panel assemblies 200 as the solar panel assemblies 200 produce energy.

Figure 2:
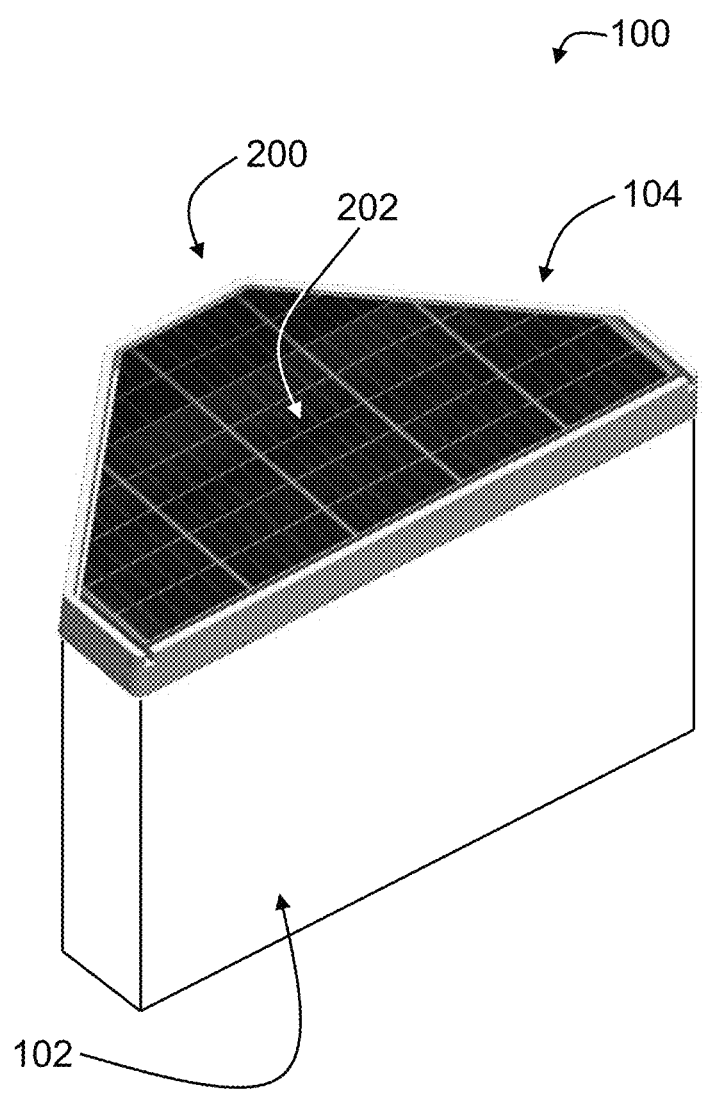
FIG. 2 shows aspects of a dock box according to exemplary embodiments hereof.

In some embodiments as shown in FIG. 2, a first solar panel base assembly 100 includes a dock box 102 and dock box lid 104.

Figure 3:
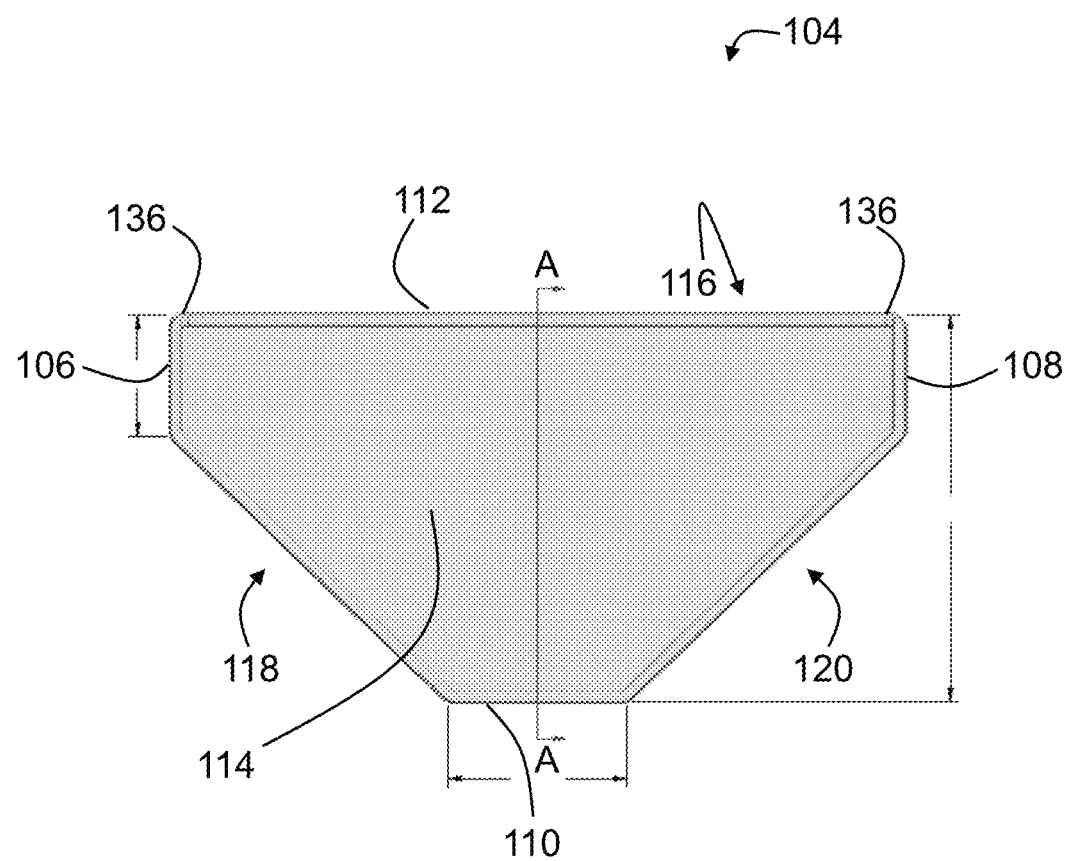
FIG. 3 shows aspects of a dock box lid according to exemplary embodiments hereof.

In some embodiments as shown in FIG. 3, the dock box lid 104 includes a left side 106, a right side 108, a front 110, a back 112, a top side 114, and an underneath side 116. In some embodiments, the lid 104 also includes a front left chamfer 118 and a front right chamfer 120. Accordingly, in some embodiments, the lid 104 includes a trapezoidal topside footprint as shown. However, it is understood that the lid 104 may include any topside footprint of any shape and/or combination of shapes, and that the scope of the system 10 is not limited in any way by the footprint of the lid 104. For example, the lid footprint may be shaped as a square, rectangle, circle, oval, triangle, pentagon, hexagon, octagon, any other shape or form, and any combinations thereof. In general, the footprint of the lid 104 may be preferably chosen to match the footprint of the dock box top opening in order to adequately cover and seal the dock box 102.

Figure 4:
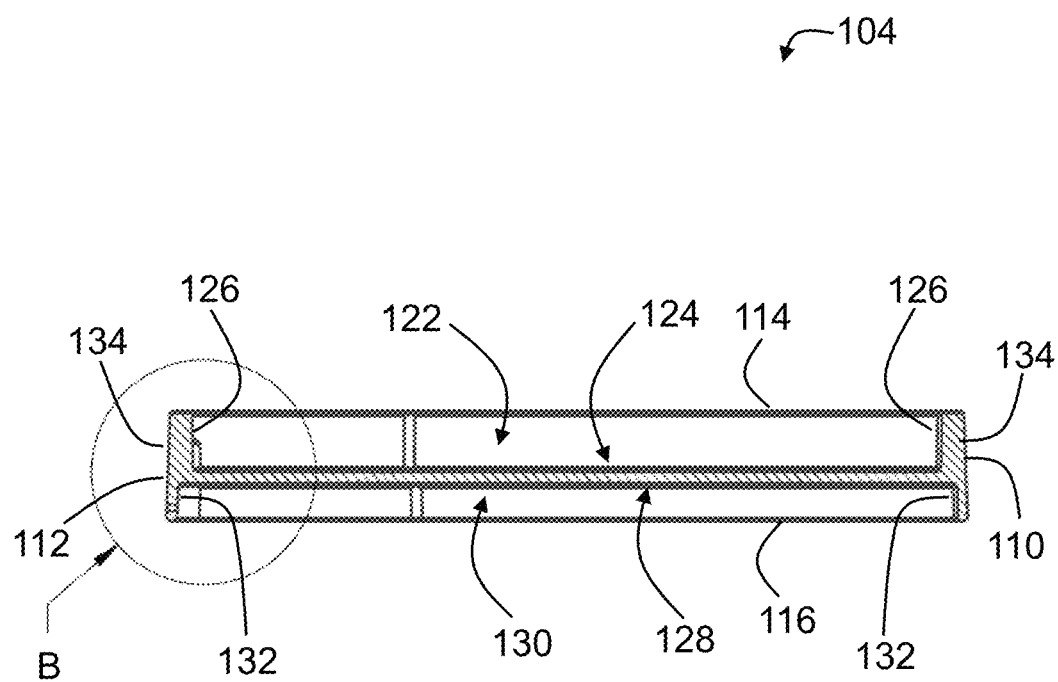
FIG. 4 shows aspects of a dock box lid according to exemplary embodiments hereof.

In some embodiments as shown in FIG. 4 taken along the perspective of cutlines A-A of FIG. 3, the dock box lid 104 includes a topside recess 122 formed in its top side 114. The recess 122 may be defined by a topside recess bottom 124 and topside recess inner sidewalls 126. The purpose of the topside recess 122 may be to receive a solar panel assembly 200 and to secure it therein. This will be described in other sections.

In some embodiments, the dock box lid 104 includes an underside recess 128 formed in its underside 116. The underside recess 128 may be defined by an underside recess bottom 130 and underside recess inner sidewalls 132. The purpose of the recess 128 may be to receive an upper portion of an associated dock box 102 and to generally cover and/or seal the box's opening.

Figure 5:
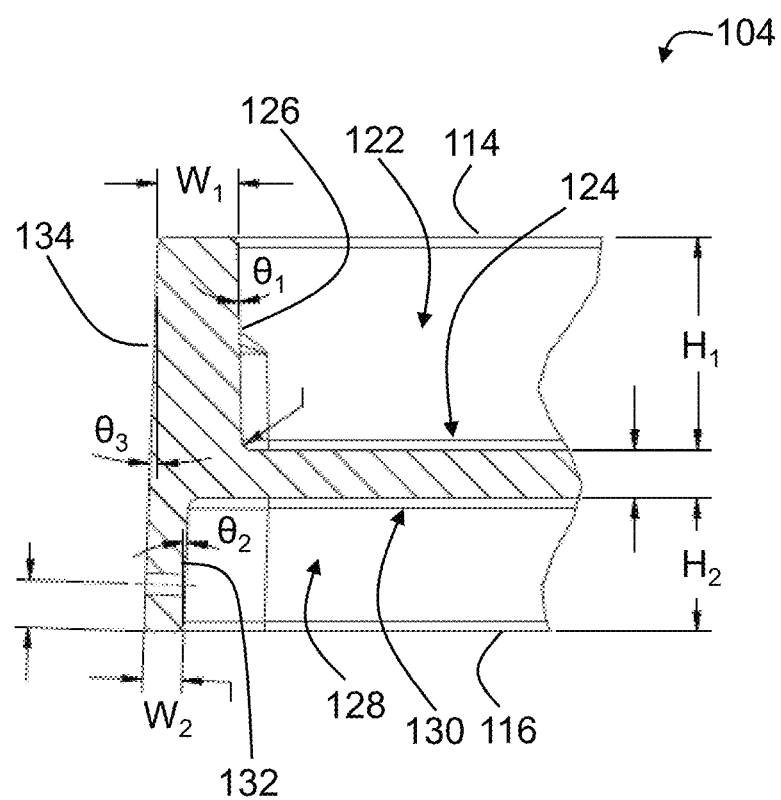
FIG. 5 shows aspects of a dock box lid according to exemplary embodiments hereof.

A detail schematic of the portion B of FIG. 4 is shown in FIG. 5. In some embodiments, the topside recess inner sidewalls 126 extend upward and outward from the topside recess bottom 124 at an angle $\theta_1$ of about 90°-100° with respect to the X-axis, and preferably about 90°-95° with respect to the X-axis, and more preferably about 91° with respect to the X-axis. This equates to a 1° outward offset angle with respect to the Y-axis as shown. In this way, the footprint of the upper opening of the topside recess 122 is larger than the footprint of its bottom 124.

In some embodiments, the underside recess inner walls 132 extend downward and outward from the underside recess bottom 130 at an angle $\theta_2$ of about 260°-270° with respect to the X-axis, and preferably about 265°-270° with respect to the X-axis, and more preferably about 268° with respect to the X-axis. This equates to a 2° outward offset angle with respect to a negative Y-axis as shown. In this way, the footprint of the opening of the underside recess 128 is larger than the footprint of its bottom 130.

In some embodiments, the lid 104 includes outer sidewalls 134 generally extending about its outer circumference thereby defining its outer perimeter. In some embodiments as shown in FIG. 5, the outer sidewalls 134 generally extend from the lid's bottom 116 to the lid's top 114 at an angle $\theta_3$ of about 80°-90° with respect to the X-axis, and preferably about 85°-90° with respect to the X-axis, and more preferably about 88° with respect to the X-axis. This equates to a 2° inward offset angle with respect to the Y-axis as shown.

In some embodiments, the width $W_2$ between an underside recess inner sidewall 132 and an outer sidewall 134 is about 30%-60% the width $W_1$ between a topside recess inner sidewall 126 and an outer sidewall 134, and more preferably about 50%.

In some embodiments, the height $H_2$ of the underside recess sidewalls 132 (i.e., the depth of the underside recess 128) is about 50%-70% the height $H_1$ of the topside recess sidewalls 126 (i.e., the depth of the topside recess 122) and preferably about 55%-65%, and more preferably about 62.5%. For example, in some embodiments, $H_2$=1.25" and $H_1$=2.0".

In some embodiments as best seen in FIG. 3, the topside recess 122 includes one or more recess gutters 136 (e.g., openings) that generally extend through the inner 126 and outer 134 sidewalls thereby providing an opening extending from within the topside recess 122 to outside the dock box lid 104. In some embodiments, the gutters 136 are located at the right and/or left sides of the lid's back 112, however the gutters 136 may be positioned in any location as required. In some embodiments, each gutter 136 extends from the top 114 of the lid 104 to a location between the top 114 (top of the inner and outer sidewalls 126, 134) and the topside recess's bottom 124. In some embodiments, each gutter 136 extends about 5%-100% the distance between the top 114 and the recess's bottom 124, and preferably about 25%-75% the distance, and more preferably about 50% the distance. The gutters 136 may provide a channel through which liquid (e.g., water, cleaning solution, etc.) that may collect on or beside the solar panel assembly 200 (e.g., water that may collect in a gap between the solar panel assembly 200 and an inner side wall 126) to escape.

Figure 8:
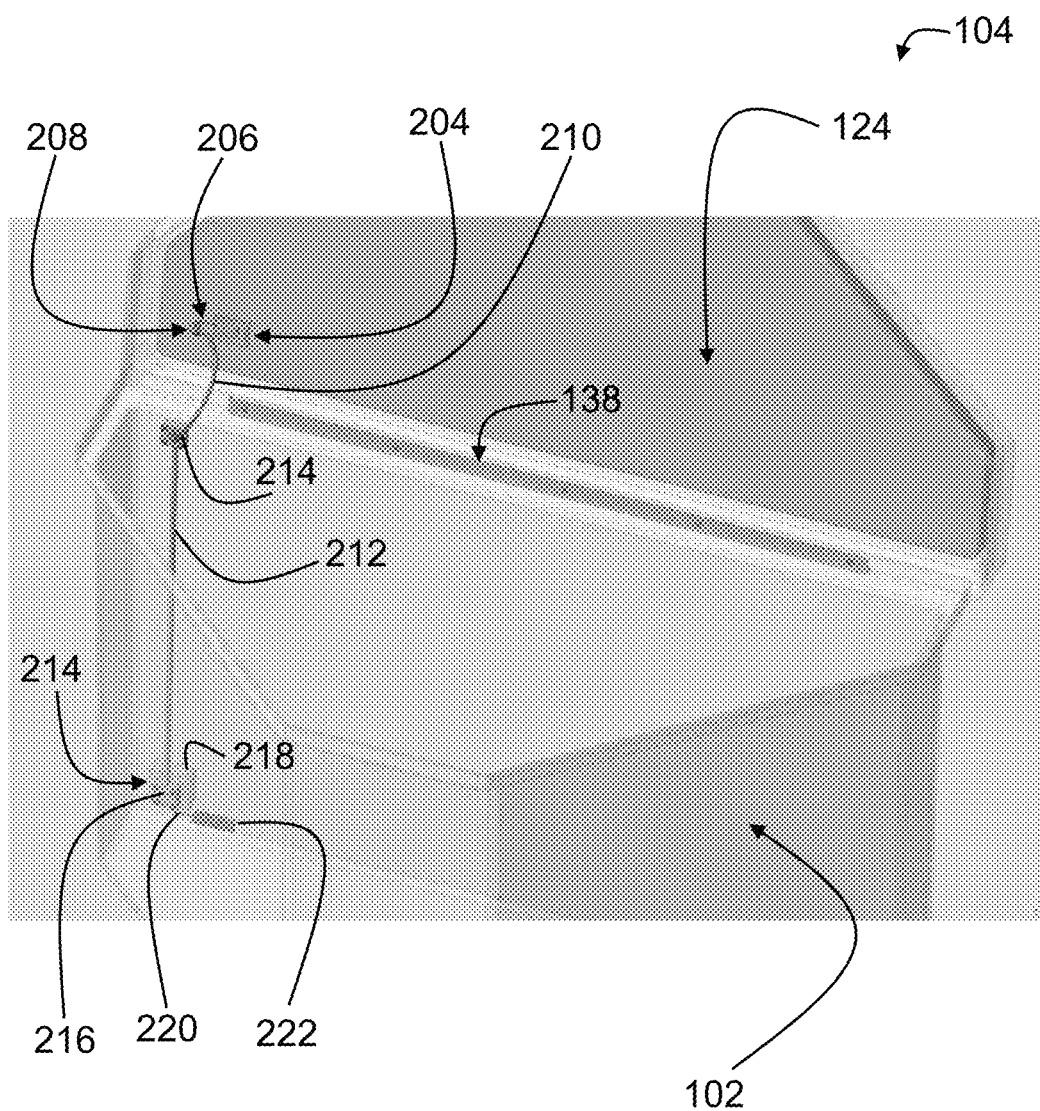
FIG. 8 shows aspects of an electrical terminal and associated components according to exemplary embodiments hereof.

In some embodiments, the lid 104 is configured to the dock box 102 using a hinge element 138 (see FIG. 8). The hinge element 138 may be configured between the back underside 116 of the lid 104 (e.g., along the back 112) and a top rim of an associated dock box 102. For example, a single elongate hinge element 138 may extend along about 50% or more of the lid's back 112 and the associated dock box top rim. In another example, multiple hinge elements 138 may extend along this junction.

Figure 6:
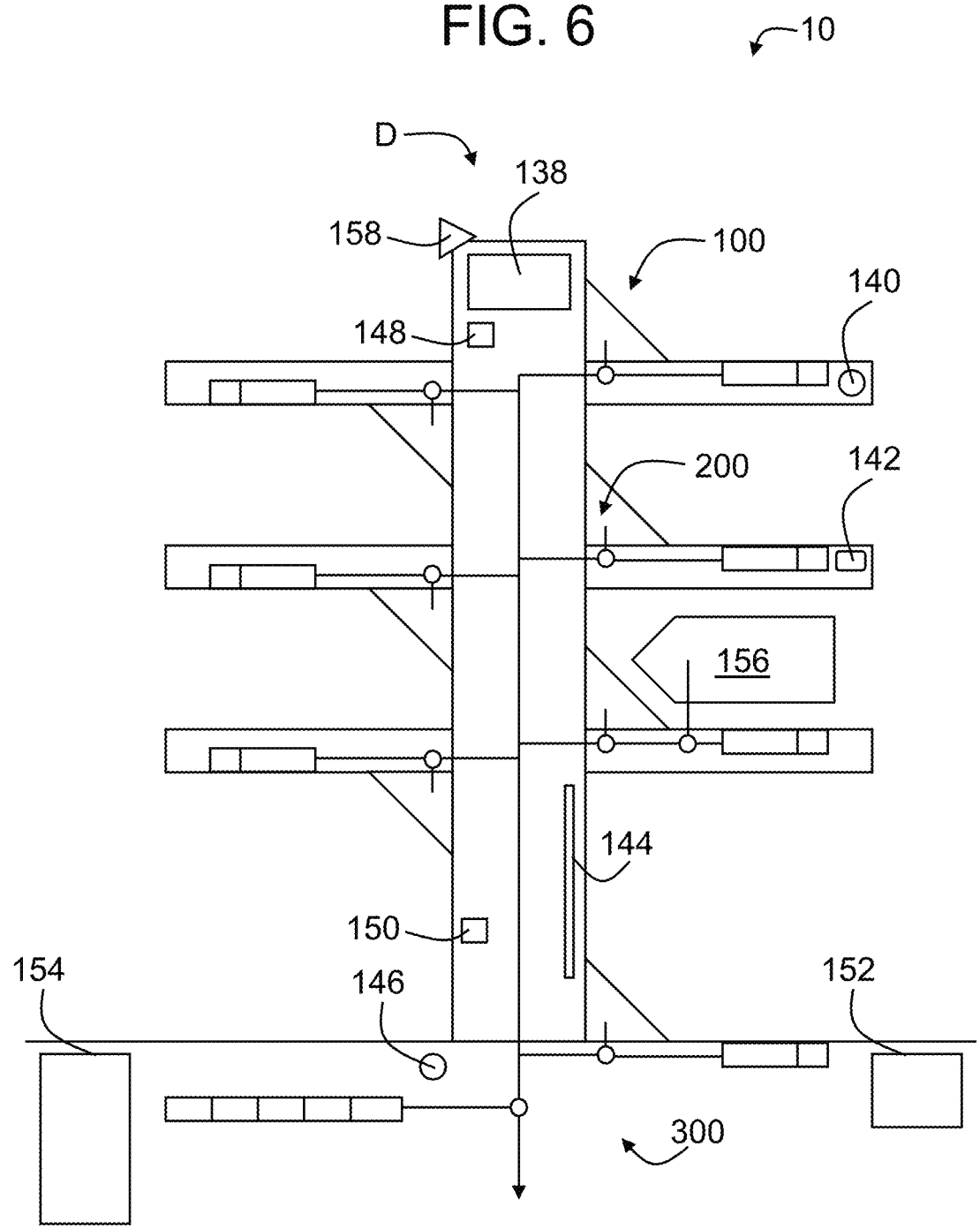
FIG. 6 shows aspects of a marina solar energy system with solar panel base assemblies according to exemplary embodiments hereof.

In some embodiments as shown in FIG. 6, additional solar panel base assemblies 100 may include, without limitation, one or more portions of a dock 138, light posts 140, mooring cleats 142, hand railings 144, guard posts 146, waste bins 148, general utility boxes 150, boat lift utility boxes 152, bathroom facilities 154, utility covers (e.g., manhole covers, etc.), shade makers, other types of assemblies 100 and any combinations thereof. It is understood that these additional base assemblies 100 may include sun-facing surfaces (e.g., top surfaces) that may support solar panel assemblies 200 to collect sunlight.

In some embodiments as shown in FIG. 6, the solar panel base assemblies 100 may include a floating solar assembly 156 that may be stationed in a slip S (or in any other suitable location in relation to the dock D). The floating solar assembly 156 may include a watercraft (e.g., a boat) configured with solar panel assemblies 200 (e.g., on the craft's bow, Lazarette covers, etc.), a dedicated floating solar platform, any other type of floating item, and any combinations thereof. The floating solar assembly 156 may preferably be electrically configured with the energy distribution system 300 as the other solar panel base assemblies 100 as described herein.

In some embodiments as shown in FIG. 6, the solar panel base assemblies 100 may include one or more mirrors 158 configured to reflect sunlight onto the one or more solar power assemblies 200. In this way, the assemblies 200 may include concentrated solar power assemblies 200 and receive direct sunlight from the sun as well as reflected sunlight from the sun thereby increasing the incident sunlight to the assemblies 200 causing an increase in generated solar power. It may be preferable that the mirrors 158 be located in unpopulated areas such that the danger of redirecting sunlight onto or generally at people or other living organisms is minimized.

Solar Panel Assemblies 200

In some embodiments, the system 10 includes one or more solar panel assemblies 200 adapted to be received and supported by one or more solar panel base assemblies 100. In some embodiments, each solar panel assembly 200 includes one or more solar panels 202 that include photovoltaic cells.

In general, each solar panel base assembly 100 includes one or more receiving locations adapted to receive and support one or more solar panel assemblies 200. For example, taking the dock box lid 104 as a first example, the dock box lid 104 includes a topside recess 122 adapted to receive and support one or more solar panels 202. The solar panels 202 may be sized and arranged to generally fit within the topside recess 122 as shown in FIG. 2.

In some embodiments, the depth H1 of the topside recess 122 is chosen such that when the solar panels 202 are received into the recess 122 that top surface of the solar panels 202 is generally flush with the top 114 of the dock box lid 104.

In some embodiments, with the top surface of a solar panel 202 generally flush with the top 114 of the lid 104, a small gap exists between the bottom of the solar panel 202 and the bottom 124 of the topside recess 122. In addition, a small gap exists between the outer sidewalls 134 and the inner sidewalls of the topside recess 122. This gap between the recess 122 and the solar panel 202 may be filled with an epoxy (or similar) to secure the solar panel 202 within the recess 122. Potting also may be added to the recess 122 and/or to the outer surfaces of the solar panel 202 to seal the electrical connections and components therein and to provide protection from salt water, moisture, corrosive agents, shock, vibration, other undesirable elements and forces, and any combinations thereof. The potting may include thermosetting plastics, silicon rubber gels, epoxy, polyurethane, or other types of materials.

The solar panels 202 may include any type(s) of solar cells, including, without limitation, Monocrystalline solar panels (Mono-SI), Polycrystalline solar panels (p-Si), Thin-Film Amorphous Silicon solar panels (A-SI), Concentrated PV cells (CVP), Bi-Facial cells with mirror or other types of reflective backings, other suitable types of solar cells, and any combinations thereof.

Figure 7:
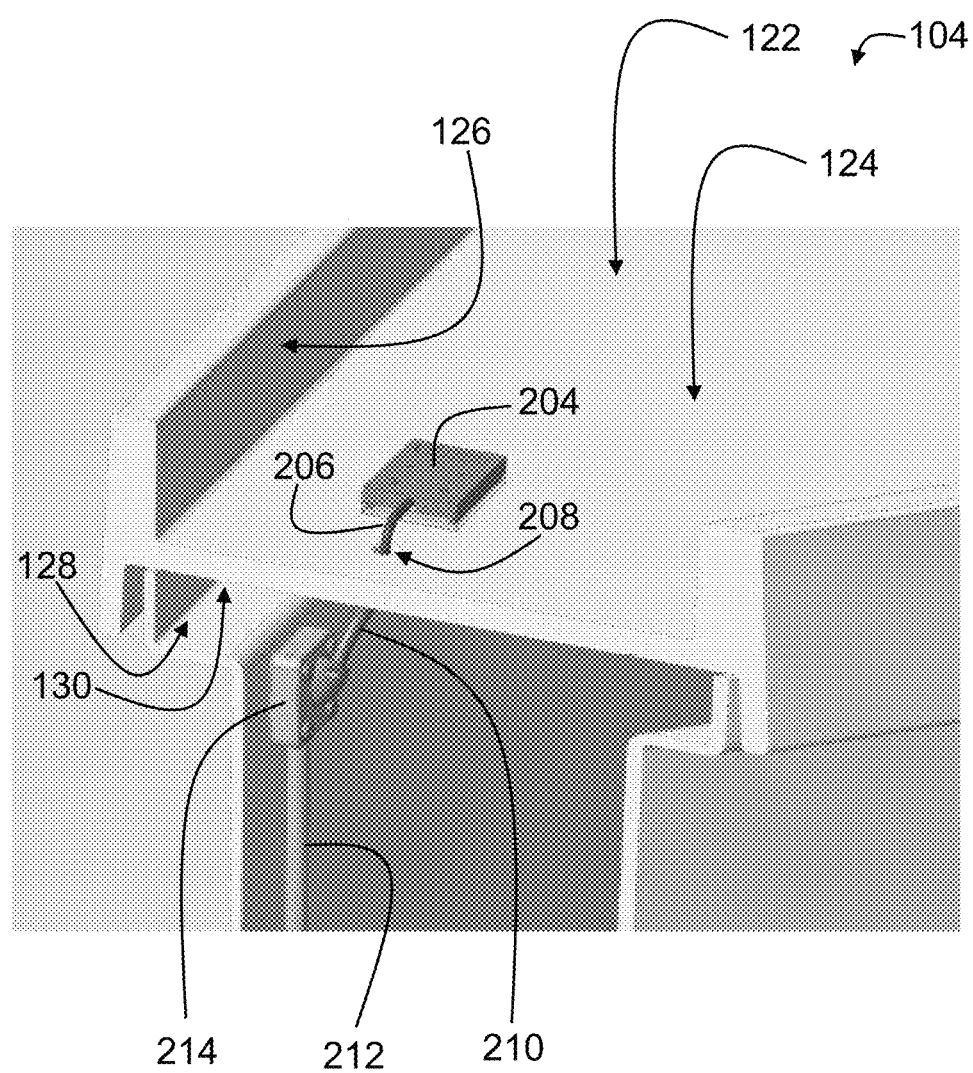
FIG. 7 shows aspects of an electrical terminal and associated components according to exemplary embodiments hereof.

In some embodiments as shown in FIG. 7, the solar panel assembly 200 includes a first electrical terminal 204 configured with the dock box lid 104 (e.g., with the bottom 124 of the topside recess 122) and adapted to electrically connect the output of the solar panel assembly 200 to an electrical output line 206. The electrical output line 206 may extend from the electrical terminal 204 and pass through a through hole 208 in the dock box lid 104 (e.g., preferably through the bottom 124 of the lid's topside recess 122 to the bottom 128 of the lid's underneath side recess 130). Accordingly, with the lid 104 configured with a corresponding box 102, the output line 206 may pass through the dock box lid 104 and into an area within the dock box 102. It is preferable that the through hole 208 include a gasket or other type of waterproof sealant so that moisture and/or any other elements may pass through the hole 208

At the output of the through hole 208, the electrical output line 206 may electrically transition to a flexible electrical line 210 that may flex and/or bend to accommodate the opening of the lid 204 (as shown in FIG. 8) and the subsequent closing of the lid 204 (as shown in FIG. 7).

The flexible electrical line 210 may then be electrically coupled to a second electrical output line 212 (e.g., via an upper junction box 214) that extends down the inner volume of the dock box 102 (e.g., along an inner wall of the box 102).

As shown in FIG. 8, the second line 212 may extend to a lower inner portion (e.g., to the bottom) of the dock box 102 and pass through a second through hole 214 that extends from inside the dock box 102 to outside the dock box 102. In some embodiments, the second line 212 is configured with a lower inside junction box 216 that is electrically coupled to a lower outside junction box 218 (via the second through hole 214). The lower outside junction box 218 may then be electrically coupled to a third electrical line 220 that may terminate into an electrical connector 222. Note that the wall of the dock box 102 in FIG. 8 is shown as opaque to show the outside junction box 218, the third electrical line 220 and the electrical connector 222, and it is understood that these elements are configured outside the dock box 102.

Figure 9:
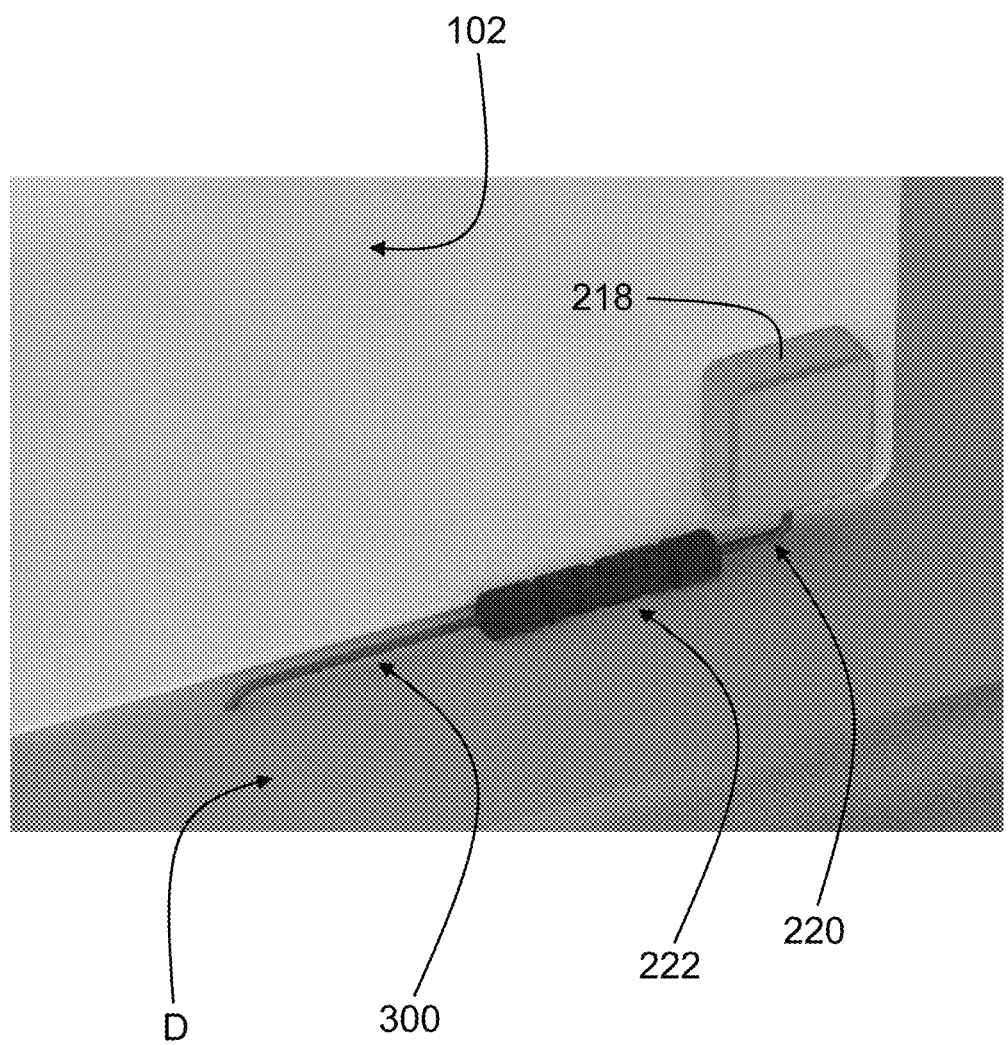
FIG. 9 shows aspects of a junction box according to exemplary embodiments hereof.

FIG. 9 depicts the outside junction box 218, the third electrical line 220 and the electrical connector 222. The electrical connector 222 facilitates the electrical communication of the solar panel assembly 200 to the energy distribution system 300 at the dock D.

Energy Distribution System 300

In some embodiments, the system 10 includes an energy distribution system 300 to collect, store, and generally distribute the energy generated by the solar panel assemblies 200.

Figure 10:
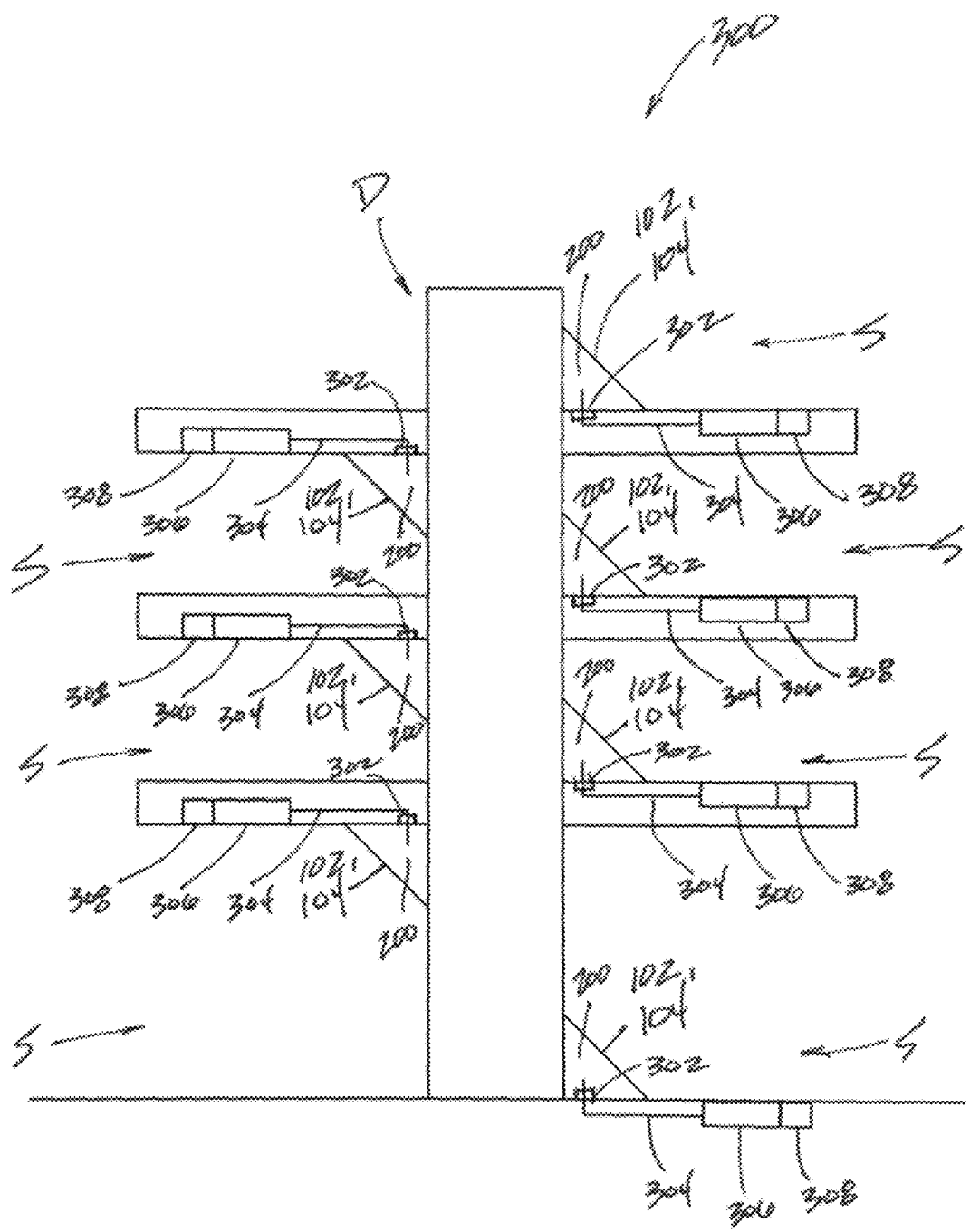
FIG. 10 shows aspects of marina solar energy system according to exemplary embodiments hereof.
Figure 11:
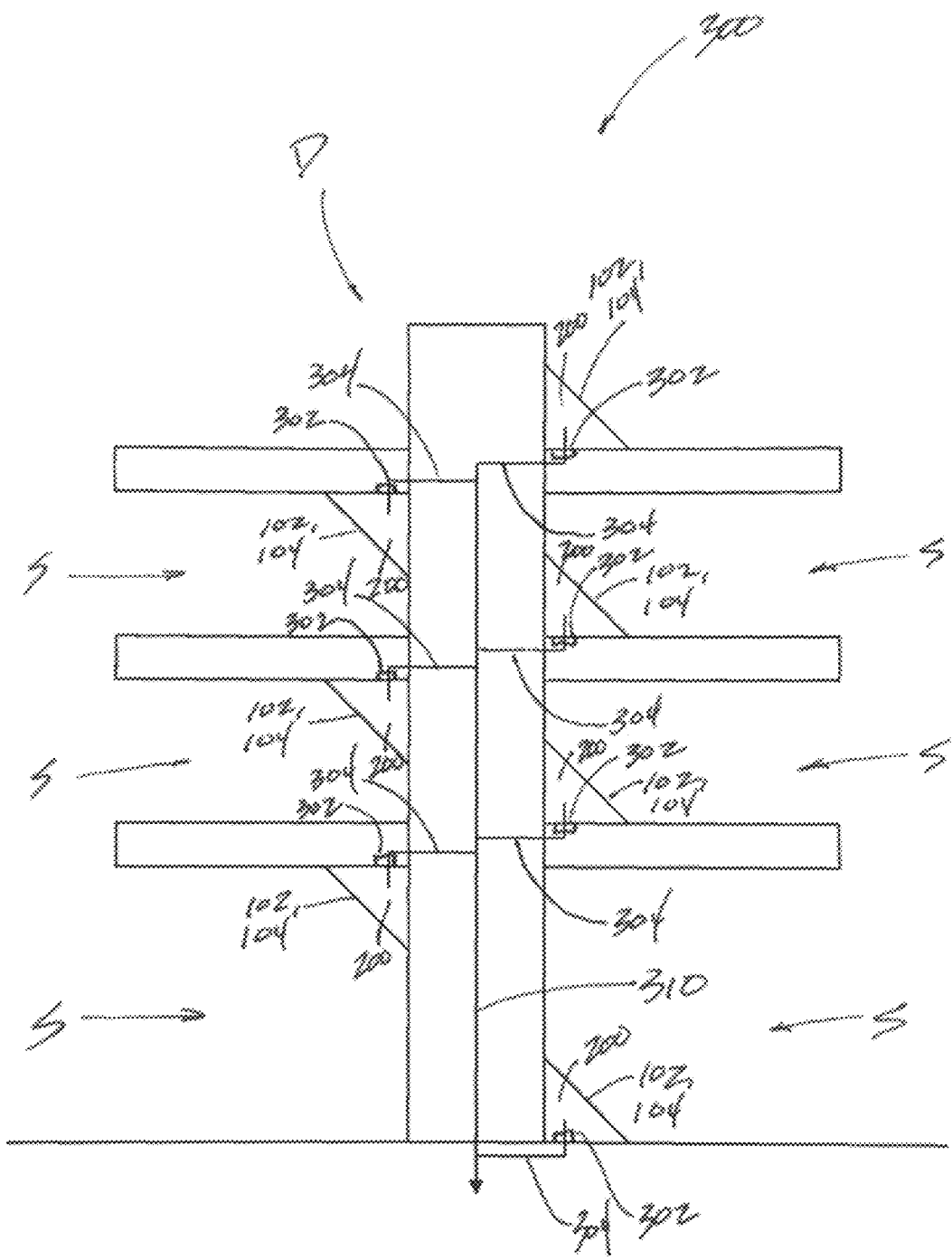
FIG. 11 shows aspects of marina solar energy system according to exemplary embodiments hereof.
Figure 12:
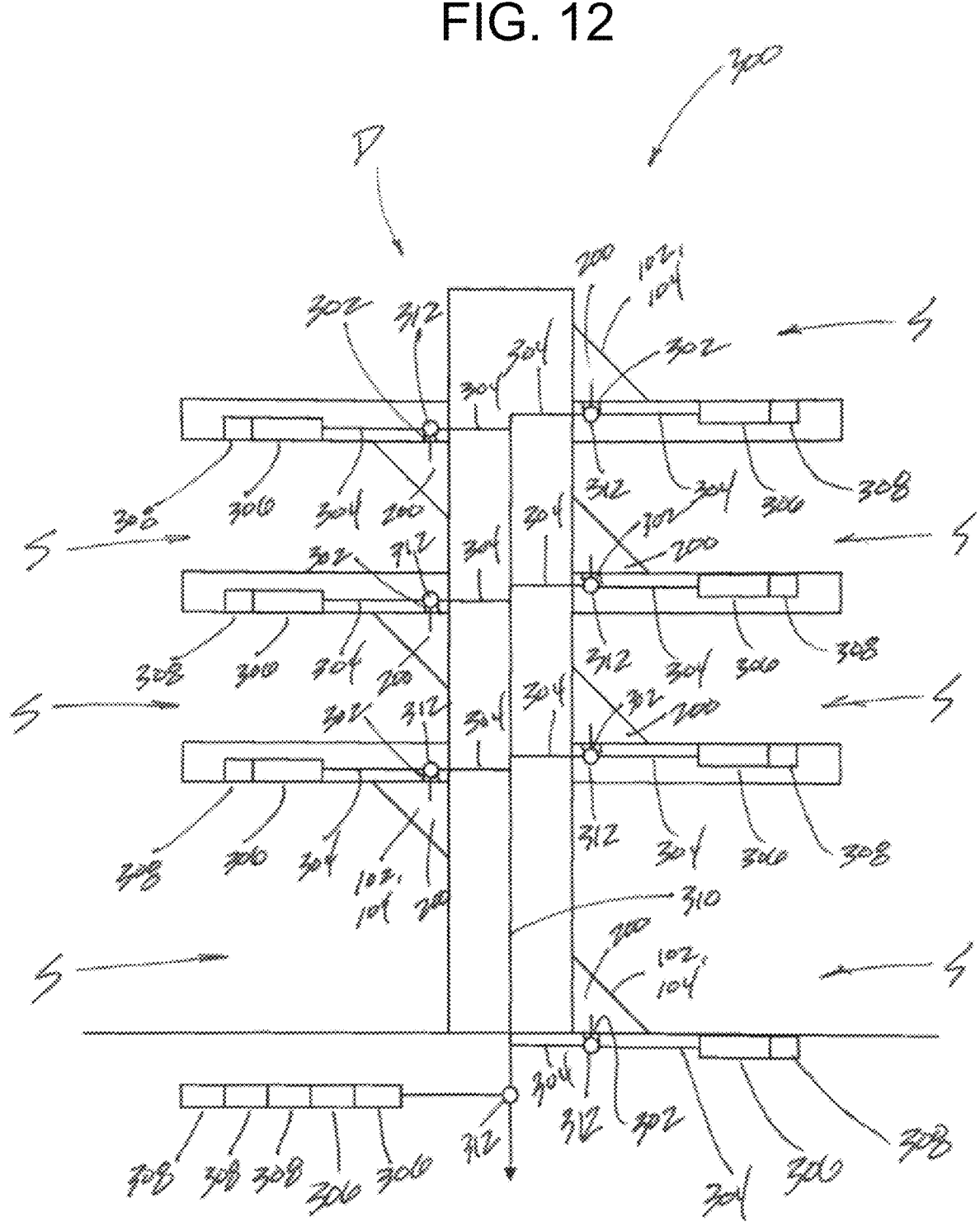
FIG. 12 shows aspects of marina solar energy system according to exemplary embodiments hereof.

In some embodiments as shown in FIGS. 10-12, an example marina may include one or more docks D including one or more slips S, with each slip configured to host a watercraft (e.g., a boat). In a first example, each slip S may be configured with at least one dock box 102 including at least one dock box lid 104 configured with at least one solar panel assembly 200.

In some embodiments as shown in FIG. 10, each dock box lid 104 and its associated solar panel assembly 200 are individual standalone power supplies adapted to provide power to an occupant within an associated slip S. In a first example, each dock box lid 104 and associated solar panel assembly 200 are electrically coupled to an electrical junction box 302 (that may correspond to outside junction box 218), an electrical output line 304 extending from the junction box 302 (e.g., via electrical connector 222) to a rechargeable power supply 306 (e.g., a rechargeable battery), and at least one electrical outlet 308 electrically coupled to the power supply 306.

In some embodiments, power generated by a solar panel assembly 200 passes through the junction box 302 and is electrically communicated through the electrical line 304 to the rechargeable power supply 306. In this way, energy generated by the solar panel assembly 200 is stored by the rechargeable power supply 306 and available for use.

It may be preferable that the junction box 302 include one or more bypass diodes. As is known in the art, a diode may generally be a semiconductor device with two terminals (an anode and a cathode) that may allow the flow of electrical current through the device in one direction only (from the anode to the cathode). The purpose of the bypass diode may be to electrically isolate a solar panel assembly 200 that may become damaged or otherwise defective (or possibly shaded). This may protect the rechargeable power supply 306 from being inadvertently drained or otherwise negatively affected.

In some embodiments, each rechargeable power supply 306 includes one or more electrical outlets 308 configured to be accessible by a boat moored within the corresponding slip S. In this way, a moored boat may plug one or more electrical devices into an electrical outlet 308 to receive power from the rechargeable power supply 306. In some embodiments, the rechargeable power supply 306 provides direct current (DC) received from the solar panel assembly 200 to the outlets 308 while in other embodiments the rechargeable power supply 306 includes an inverter to covert the DC power to alternating current (AC) to provide AC power to the outlets 308. Other electronic elements such as transformer(s) also may be included. In this way, electrical devices requiring either DC and/or AC may be accommodated.

In some embodiments as shown in FIG. 11, one or more dock box lids 104 and associated solar panel assemblies 200 are configured in parallel (or in series) and arranged to supply cumulative power to a main power line 310. The main power line 310 may then distribute the collected power to other areas of the marina, to a local power grid, to one or more rechargeable power supplies 306, to other electrical outlets 308, to other destinations and to any combinations thereof. In some embodiments, some or all of the output power may be supplied to one or more saltwater desalination facilities or units (e.g., onsite at the marina, at an offsite facility, etc.).

In some embodiments, it may be preferable to include additional electrical junction boxes 302 at the electrical junctions between each electrical line 304 and the main power line 310 to isolate individual solar panel assemblies 200 that may become defective (or shaded). However, depending on the configuration of the various solar panel assemblies 200, this may not be necessary.

In some embodiments as shown in FIG. 12, the energy distribution system 300 includes a hybrid of standalone power generating solar panel assemblies 200 (with associated dock box lids 104) and solar panel assemblies 200 configured with a main power line 310. In this scenario, the energy distribution system 300 includes one or more power switches 312 configured (e.g., with an associated junction box 302) to switch power generated from an associated solar panel assembly 200 either to a rechargeable power supply 306 with power outlets 308 for use by occupants of a slip S, or to a main power line 310 that may distribute the power elsewhere.

In some embodiments, the power distribution system 300 is configured to receive energy from additional sources such as, without limitation, wind turbines, water turbines, other sources, and any combinations thereof. In some embodiments, these sources are configured within the marina as elements of the system 10.

In all of the embodiments described herein or otherwise, it is understood that the various elements and components are waterproof, water resistant, corrosive resistant, etc., and otherwise protected from the elements such that none of the system's elements may be damaged by water, salt, dirt, debris, weather, sunlight, other elements, and any combinations thereof.

It also is understood that any aspect or detail of any embodiment described herein or otherwise may be combined with any other aspect or detail of any other embodiment to form additional embodiments all of which are within the scope of the system 10.

It is understood that other configurations of other numbers of shim members and/or base plates may be used to translate vertical forces into lateral forces and to thereby vary the width of the configurations.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and / or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

The invention claimed is:

1. A solar dock box assembly comprising:
   a first dock box body including a box bottom and box sidewalls defining an inner volume and an open top;
   a first dock box lid adapted to cover the open top and including a topside and an underneath side, and a left side, a right side, a front side, and a rear side defining an outer perimeter;
   a topside sidewall extending about the outer perimeter on the topside and including a first inner surface and a first outer surface, the first inner surface and the topside defining a topside recess;
   a first electrical terminal configured within the topside recess;
   at least one solar panel received into the topside recess and including an electrical output in electrical communication with the first electrical terminal;
   a first opening within the topside recess and passing through the lid from the topside to the underneath side;
   a second opening within the inner volume and passing through a box sidewall to outside the inner volume;
   a second electrical terminal configured on an outside portion of a box sidewall;
   a third electrical terminal configured within the inner volume and coupled to an inside surface of a first box sidewall;
   a first electrical line including a second flexible electrical line in electrical communication with the first electrical terminal and extending through the first opening into the inner volume and terminating at and in electrical communication with the third electrical terminal, and a third electrical line in electrical communication with and extending from the third electrical terminal and through the second opening to outside the inner volume and in electrical communication with the second electrical terminal; and
   a gutter configured in the topside sidewall and including a third opening in the topside sidewall extending from within the topside recess to outside the topside recess.

2. The assembly of claim 1 further comprising an underneath sidewall extending about the outer perimeter on the underneath side and including a second inner surface and a second outer surface, the second inner surface and the underneath side defining an underneath recess.

3. The assembly of claim 2 wherein the underside recess is adapted to receive the open top of the first dock box body.

4. The assembly of claim 2 wherein the second inner surface extends from the underneath side at an outward angle away from the underneath recess of about 0.1° to 5°.

5. The assembly of claim 2 wherein the second outer surface extends from the underneath side at an outward angle away from the underneath recess of about 0.1° to 5°.

6. The assembly of claim 2 wherein the topside recess includes a first depth, and the underneath recess includes a second depth, and the second depth is about 50%-70% the first depth.

7. The assembly of claim 2 wherein the topside sidewall includes a first width between the first inner surface and the first outer surface, and the underneath sidewall includes a second width between the second inner surface and the second outer surface, and the second width is about 30%-60% the first width.

8. The assembly of claim 1 wherein the second electrical terminal includes an electrical junction box.

9. The assembly of claim 1 further comprising an electrical connector in electrical communication with the second electrical terminal and releasably electrically connected to a fourth electrical line.

10. The assembly of claim 9 wherein the fourth electrical line is electrically connected to at least one of a rechargeable battery, an electrical outlet, and an electric grid.

11. The assembly of claim 10 further comprising an electrical switch releasably electrically connected between the fourth electrical line and at least one of the rechargeable battery, the electrical outlet, and the electric grid.

12. The assembly of claim 1 wherein the first inner surface extends from the topside at an outward angle away from the topside recess of about 0.1° to 5°.

13. The assembly of claim 1 wherein the first inner surface extends from the topside at an outward angle away from the topside recess of about 1°.

14. The assembly of claim 1 wherein the first outer surface extends from the topside at an inward angle towards the topside recess of about 0.1° to 5°.

15. The assembly of claim 1 wherein the first outer surface extends from the topside at an inward angle towards the topside recess of about 2°.

16. The assembly of claim 1 further comprising:
   a hinge element configured between the first dock box body and the first dock box lid, the first dock box lid rotatable about the hinge from a first position to a second position, wherein in the first position the lid covers the open top and wherein in the second position the open top is at least partially exposed.

17. The assembly of claim 16 wherein the second flexible electrical line is adjacent the hinge and flexes as the dock box lid rotates from the first position to the second position.

18. The assembly of claim 16 wherein the third terminal attaches an end of the second flexible electrical line and an end of the third electrical line to the inside surface of the first box sidewall.

19. A solar dock box assembly comprising:
   a first dock box body including a box bottom and box sidewalls defining an inner volume and an open top;
   a first dock box lid adapted to cover the open top and including a topside and an underneath side, and a left side, a right side, a front side, and a rear side defining an outer perimeter;
   a topside sidewall extending about the outer perimeter on the topside and including a first inner surface and a first outer surface, the first inner surface and the topside defining a topside recess;
   a first electrical terminal configured within the topside recess;
   at least one solar panel received into the topside recess and including an electrical output in electrical communication with the first electrical terminal;
   a first opening within the topside recess and passing through the lid from the topside to the underneath side;
   a second opening within the inner volume and passing through a box sidewall to outside the inner volume;
   a second electrical terminal configured on an outside portion of a box sidewall;
   a first electrical line in electrical communication with the first electrical terminal and extending through the first opening into the inner volume, and extending through the second opening to outside the inner volume and in electrical communication with the second electrical terminal; and a gutter configured in the topside sidewall and including a third opening in the topside sidewall extending from within the topside recess to outside the topside recess.

\* \* \* \* \*